US007493770B2

(12) United States Patent
Christianson et al.

(10) Patent No.: US 7,493,770 B2
(45) Date of Patent: Feb. 24, 2009

(54) METHODS AND APPARATUS FOR REGULATING AIRFLOW SUPPLY SYSTEMS

(75) Inventors: Eric Jon Christianson, Lebanon, OH (US); Jerry Wayne Myers, West Alexandria, OH (US); John Mathew Hand, West Alexandria, OH (US); Kevin Todd Bowers, Bellbrook, OH (US)

(73) Assignee: General Electric Company, Schenectady, NY (US)

( * ) Notice: Subject to any disclaimer, the term of this patent is extended or adjusted under 35 U.S.C. 154(b) by 504 days.

(21) Appl. No.: 10/914,293

(22) Filed: Aug. 9, 2004

(65) Prior Publication Data

US 2006/0026965 A1     Feb. 9, 2006

(51) Int. Cl.
*F02C 9/18* (2006.01)
(52) U.S. Cl. .................. 60/785; 137/512.1; 137/527
(58) Field of Classification Search .............. 60/785; 137/511, 512.1, 515, 516.11, 527; 251/305
See application file for complete search history.

(56) References Cited

U.S. PATENT DOCUMENTS

| | | | | |
|---|---|---|---|---|
| 2,877,792 A | * | 3/1959 | Tybus | 137/512.1 |
| 2,925,825 A | * | 2/1960 | Staiger | 137/514 |
| 3,292,653 A | * | 12/1966 | Scaramucci | 137/315.33 |
| 3,965,926 A | * | 6/1976 | Buckner | 137/512.1 |
| 4,043,358 A | | 8/1977 | Sliski | |
| 4,774,981 A | * | 10/1988 | Mizusawa | 137/512.1 |
| 5,246,032 A | | 9/1993 | Muddiman | |
| 5,518,026 A | * | 5/1996 | Benjey | 137/512.15 |
| 6,659,711 B2 | | 12/2003 | Schofield et al. | |
| 6,899,127 B1 | * | 5/2005 | Swingley | 137/533.11 |
| 2003/0091428 A1 | | 5/2003 | Schofield et al. | |

FOREIGN PATENT DOCUMENTS

| | | |
|---|---|---|
| DE | 3402203 A1 | 8/1985 |
| EP | 1312763 A1 | 5/2003 |
| FR | 2602850 A1 | 2/1988 |
| GB | 2164424 A | 3/1986 |

OTHER PUBLICATIONS

International Search Report; Place of Search—London; dated Oct. 20, 2005; Reference 134537/10848; Application No. GB0515221.0; 3 Pgs.

* cited by examiner

*Primary Examiner*—L. J. Casaregola
(74) *Attorney, Agent, or Firm*—William Scott Andes; Armstrong Teasdale LLP

(57) ABSTRACT

A check valve is provided that includes a valve housing that has a side wall and a flow path therethrough, the side wall defining the flow path. The flow path includes an inlet, an outlet, and a centerline extending between the inlet and the outlet. At least one control member is positioned in the flow path and movable between a first position, wherein fluid flow through the valve housing is substantially prohibited and a second position wherein fluid flow is permitted. The side wall includes a stop configured to limit movement of the at least one control member at a pre-determined stop angle relative to the flow path centerline.

15 Claims, 6 Drawing Sheets

(12)United States Patent
US 7,493,770 B2

METHODS AND APPARATUS FOR REGULATING AIRFLOW SUPPLY SYSTEMS

BACKGROUND OF THE INVENTION

This invention relates generally to gas turbine engines and more particularly, to engine bleed air systems used with gas turbine engines.

Gas turbine engines used in aircraft propulsion systems typically include a bleed air system that routes air from a compressor section of the engine to an environmental control system (ECS) on the aircraft. For example, in at least some engines, bleed air is bled from the compressor through holes or ports formed in the compressor housing. However, bleed air routed from the compressor section is generally at a higher pressure and temperature than desired for use by the ECS, and is therefore conditioned prior to use. More specifically, at least some known ECS include various components, such as regulating valves and heat exchangers, to condition the bleed air for use by the ECS.

Because the pressure of air bled from a specific bleed port may change significantly as engine operating conditions change, it may not be possible, without undue complexity and costs, to provide exactly the correct pressure to the ECS from the same bleed port. Accordingly, at least some known compressors include a plurality of bleed ports positioned at more than one location in the compressor, and also a plurality of external valves to control the flow of bleed air. Typically, such control valves include at least one check valve that includes flapper doors that permit air flow in only one direction through the doors when the doors are in an open position. When closed, the doors inhibit air flow in the opposite direction. Typically, the flapper doors pivot or rotate on a pin that extends across the valve.

During engine operation, the check valves may be subjected to vibrational stresses induced by the engine and/or excitation from the bleed air stream. For example, with known check valves, when the check valve flapper doors are open, the doors may be subjected to a flutter condition that may cause the flapper doors to vibrate against a stop. Over time, continued exposure to the vibrational stresses may damage the valve pin and/or may limit the useful life of the check valve.

BRIEF SUMMARY OF THE INVENTION

In one aspect, a method for extracting bleed air from a gas turbine engine including a compressor is provided. The method includes coupling a first end of a bleed duct to a bleed port to enable fluid to be extracted from the compressor of the engine, coupling a second end of the bleed duct to a check valve having a cross sectional flow area at an outlet of the check valve that is substantially equal to a cross sectional flow area at an inlet of the check valve, and controlling fluid flow from the bleed duct to the bleed port using the check valve.

In another aspect, a check valve is provided that includes a valve housing that has a side wall and a flow path therethrough, the side wall defining the flow path. The flow path includes an inlet, an outlet, and a centerline extending between the inlet and the outlet. At least one control member is positioned in the flow path and movable between a first position, wherein fluid flow through the valve housing is substantially prohibited and a second position wherein fluid flow is permitted. The side wall includes a stop configured to limit movement of the at least one control member at a pre-determined stop angle relative to the flow path centerline.

In a further aspect, a gas turbine engine bleed air supply system is provided. The bleed air supply system includes a bleed duct having first and second ends. The first end is coupled to at least one compressor bleed port, and a check valve coupled to the second end of the bleed duct. The check valve is configured to permit fluid flow from the bleed duct while substantially preventing fluid flow into the bleed duct. The check valve includes a valve housing that has a side wall and a flow path therethrough, the side wall defining the flow path. The flow path includes an inlet, an outlet, and a centerline extending between the inlet and the outlet. At least one control member is positioned in the flow path and is movable between a first position, wherein fluid flow through the valve housing is substantially prohibited and a second position wherein fluid flow is permitted. The side wall includes a stop configured to limit movement of the at least one control member at a pre-determined stop angle relative to the flow path centerline.

DETAILED DESCRIPTION OF THE INVENTION

Figure 1:
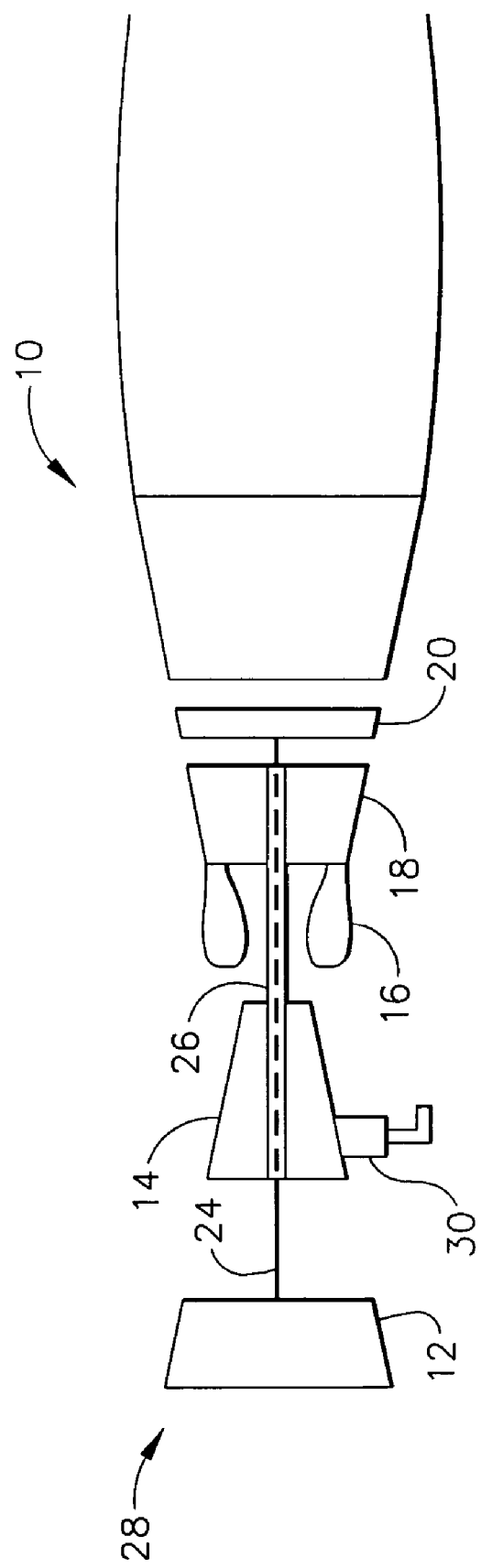
FIG. 1 is a schematic illustration of an exemplary gas turbine engine.

FIG. 1 is a schematic illustration of an exemplary gas turbine engine 10. Engine 10 includes a low pressure compressor 12, a high pressure compressor 14, and a combustor assembly 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, engine 10 is a GP7200 engine commercially available from General Electric Aircraft Engines, Cincinnati, Ohio. Engine 10 includes a bleed air supply system 30 coupled to compressor 14. In an exemplary embodiment, air is bled from a fourth stage of compressor 14.

In operation, air flows through low pressure compressor 12 from an upstream side 28 of engine 10. Compressed air is supplied from low pressure compressor 12 to high pressure compressor 14. Bleed air supply system 30 extracts bleed air from compressor 14 for use in an aircraft, such as for delivery to an environmental control system (ECS) (not shown). Compressed air is then delivered to combustor assembly 16 where it is mixed with fuel and ignited. Combustion gases are channeled from combustor 16 to drive turbines 18 and 20.

Figure 2:
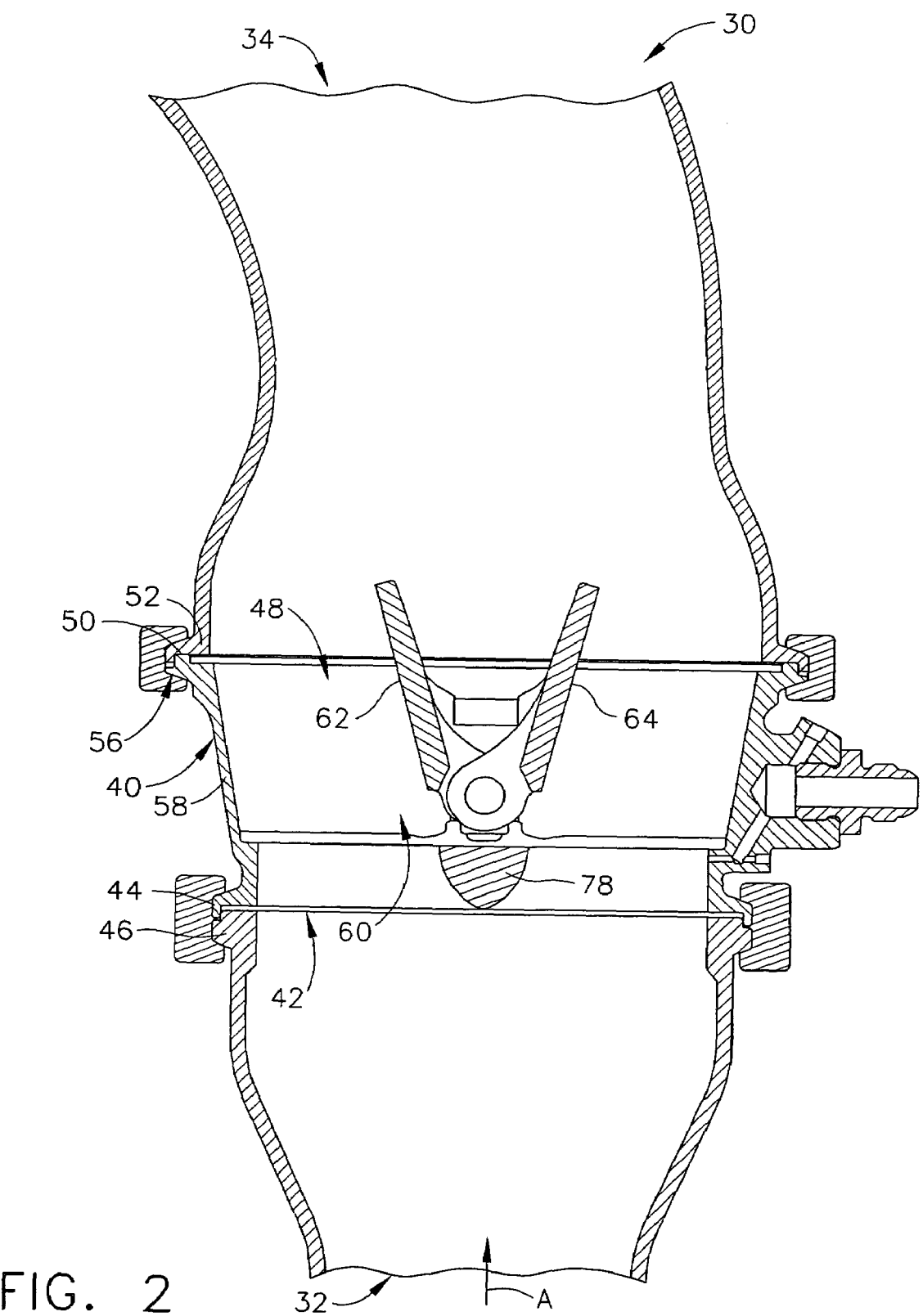
FIG. 2 is a schematic cross-sectional view of a portion of a bleed air supply system.

FIG. 2 illustrates a schematic cross-sectional view of an exemplary embodiment of a portion of a bleed air supply system 30. Bleed air system 30 includes a bleed port 32 and a bleed air duct 34. A check valve 40 interconnects bleed port 32 and bleed duct 34. In one embodiment, bleed port 32 is used to extract bleed air from a fourth stage of compressor 14. Check valve 40 regulates bleed air fluid flow from engine 10 (shown in FIG. 1). More specifically, in one embodiment, check valve 40 regulates the delivery of bleed air from compressor 14 to an ECS. Check valve 40 includes an inlet 42 and an inlet flange 44 that is coupled to a flange 46 on bleed port 32. Inlet flange 44 couples check valve 40 in flow communication with bleed port 32. Similarly, check valve 40 also includes an outlet 48 and an outlet flange 50. Outlet flange 50 is coupled to a bleed duct flange 52 and couples check valve 40 in flow communication to bleed duct 34. Check valve 40 controls fluid flow from bleed port 32 to bleed duct 34. More specifically, check valve 40 selectively enables fluid flow in the direction of arrow A, while substantially preventing fluid flow in the opposite direction.

Check valve 40 includes a valve housing 56 that has a side wall 58 that extends between inlet 42 and outlet 48. Housing 56 defines a flow path 60 through check valve 40 between inlet 42 and outlet 48. Control members 62 and 64 are positioned in the flow path 60 to regulate fluid flow through check valve 40. Control members 62 and 64 may operate together or independently from each other.

Figure 3:
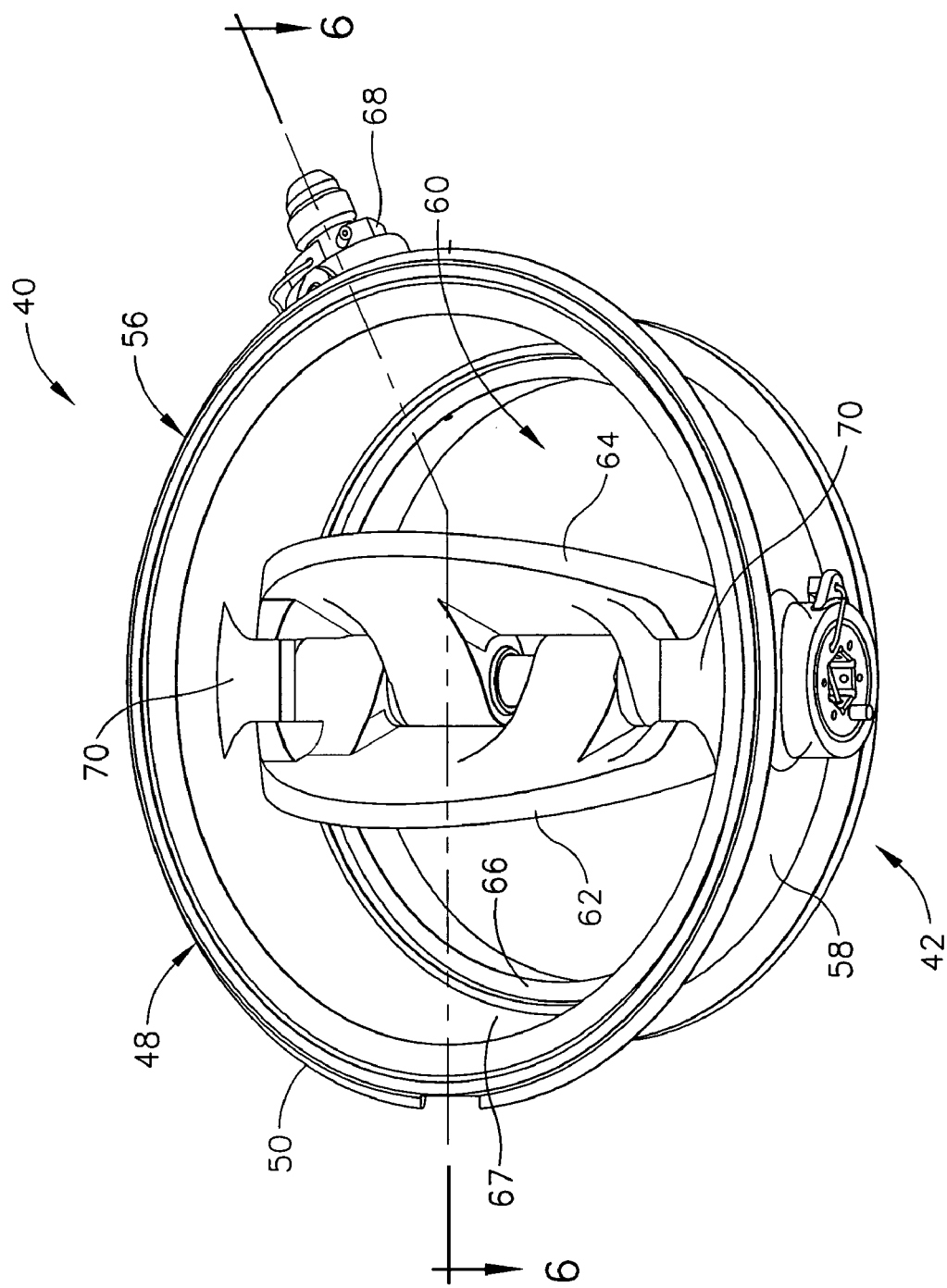
FIG. 3 is a perspective view of an exemplary check valve used with the supply system shown in FIG. 2.

FIG. 3 is a perspective view of check valve 40. In the exemplary embodiment, housing side wall 58 is substantially conical and has a substantially circular cross section at profile. Valve housing 56 has a diameter D1 (see FIG. 6) at outlet 48 that is larger than a diameter D2 at inlet 42. Inlet flange 44 and outlet flange 50 are formed integrally with valve housing 56 and extend outwardly therefrom. In the exemplary embodiment, flanges 44 and 50 are substantially circular. Alternatively, flange 44 and 48 are non-circular. A lip 66 is formed on an interior surface 67 of side wall 58 proximate check valve inlet 42. Lip 66 extends circumferentially within side wall 58 and forms a seat for control members 62 and 64 when control members 62 and 64 are in a closed position. A pressure sensing port 68 extends through side wall 58 for sensing pressure at valve inlet 42. Stops 70 are formed on side wall interior surface 67 proximate valve outlet 48. Stops 70 engage control members 62 and 64 to facilitate limiting the amount of movement and thus the size of the opening defined by control members 62 and 64. In the exemplary embodiment, stops 70 are diametrically opposed and are identical to one another. In an exemplary embodiment, stops 70 are formed integrally with the valve housing 56.

Figure 4:
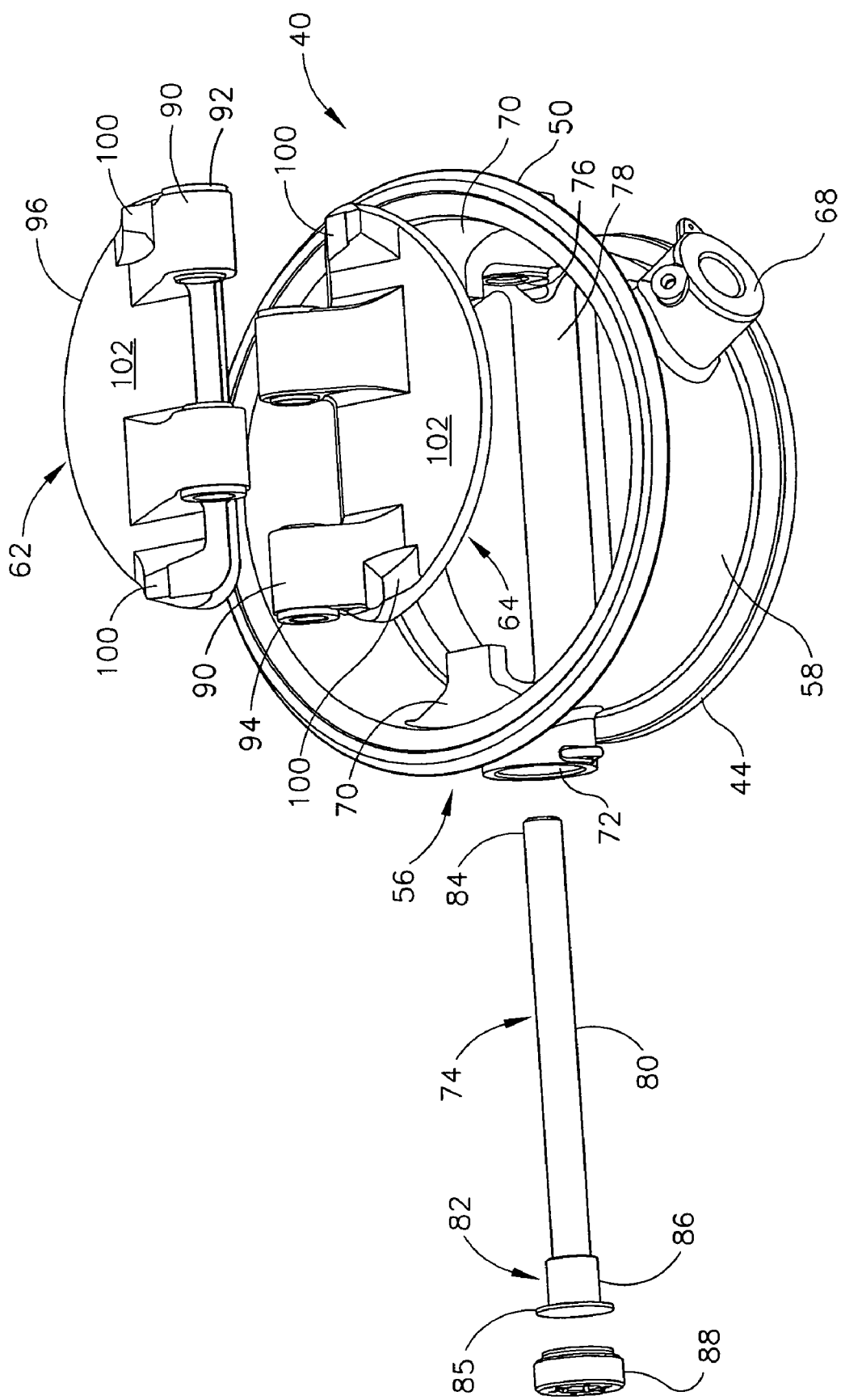
FIG. 4 is an exploded view of the check valve shown in FIG. 3.
Figure 5:
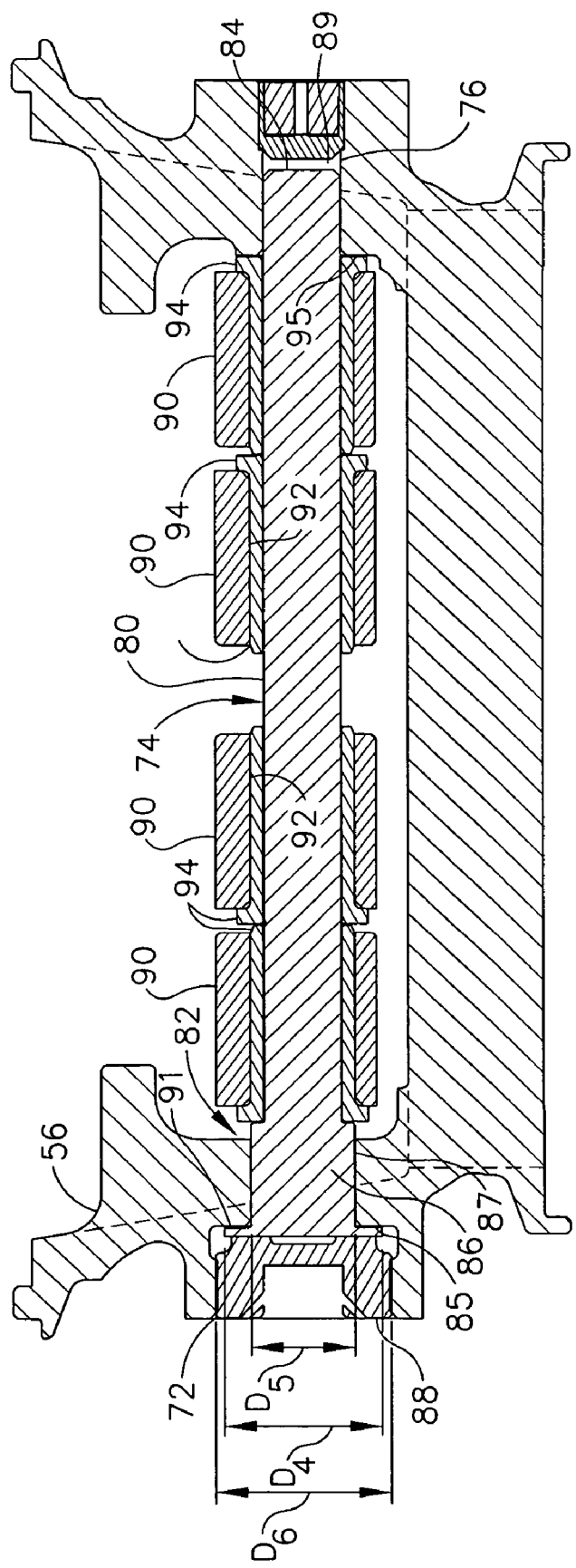
FIG. 5 is a cross sectional view of the retaining pin installed in the valve housing shown in FIG. 4.

FIG. 4 is an exploded view of check valve 40. FIG. 5 is a schematic cross-sectional view of retaining pin 74 installed in the check valve housing 56. In the exemplary embodiment, valve housing 56 is a one-piece casting that includes integrally formed flanges 44 and 50, stops 70, and lip 66 (see FIG. 3). Valve housing 56 also includes an aperture 72 that receives a retaining pin 74 to which control members 62 and 64 are rotatably coupled. An interior cavity 76 is defined in valve housing 56 diametrically opposite aperture 72, and a platform 78 extends diametrically across valve housing 56 and joins lip 66. A flow splitter 79 (see FIG. 2) extends from an underside of platform 78. Flow splitter 79 diverts fluid flow around platform 78 and towards control members 62 and 64 to facilitate preventing pressure losses within check valve 40 such that fluid flow through check valve 40 is enhanced. When retaining pin 74 is installed in valve housing 56, platform 78, retaining pin 74, and stops 70 are substantially aligned with one another.

Retaining pin 74, which also may be referred to as a hinge pin, includes an elongated shaft 80 that extends between a first end 82 and a second end 84. First end 82 includes a flange 85 that has a diameter $D_4$ and a stepped portion 86 that has a diameter $D_5$ that is slightly smaller than a diameter $D_6$ of aperture 72 such that stepped portion 86 is received in aperture 72 without resistance. Valve housing 56 includes an internal aperture 87 that is slightly smaller in diameter than flange 85, but slightly larger than stepped portion 86. More specifically, stepped portion 86 is slip fitted into internal aperture 87. Flange 85 abuts a shoulder 91 at internal aperture 87 to establish an axial position of stepped portion 86. Second end 84 of retaining pin 74 is received in cavity 76 such that pin second end 84 is supported. Cavity 76 also provides an axial clearance 89 to accommodate thermal growth of retaining pin 74. A retaining nut 88 retains retaining pin 74 in valve housing 56 and applies sufficient force to flange 85 against shoulder 91 such that rotation and axial motion of retaining pin 74 in valve housing 56 is substantially prohibited.

In the exemplary embodiment, control members 62 and 64 are identical. Each control member 62 and 64 includes a pair of mounting arms 90 that rotatably couple each member 62 and 64 to retaining pin 74. In the exemplary embodiment, control members 62 and 64 are hinged on retaining pin 74 and are independently operable. Each mounting arm 90 includes an aperture 92 that receives a bushing 94. In one embodiment, bushings 94 are press fit into mounting arms 90. Bushings 94 facilitate providing wear resistance between retaining pin 74 and mounting arms 90. In addition, bushings 94 extend through mounting arms 90. Flange 85, when positioned against shoulder 91 axially positions stepped portion 86 such that bushings 94 cooperate with stepped portion 86 and a shoulder 95 on valve body 56 to facilitate aligning control members 62 and 64 and eliminate the need for shim washers during assembly of control members 62 and 64. In one embodiment, bushings 94 are fabricated from cobalt.

Each control member 62 and 64 includes a flapper portion 96 from which mounting arms 90 extend. Flapper portions 96 are substantially semi circular and extend across flow path 60. In the exemplary embodiment, flapper portions 96 have a thickness T (see FIG. 6) which tapers from a central portion proximate mounting arms 90 to a reduced thickness at an outer periphery 98. Flapper portions 96 include projections 100 that extend from an upper surface 102.

Projections 100 are positioned to engage stops 70 when control members 62 and 64 are fully open.

Figure 6:
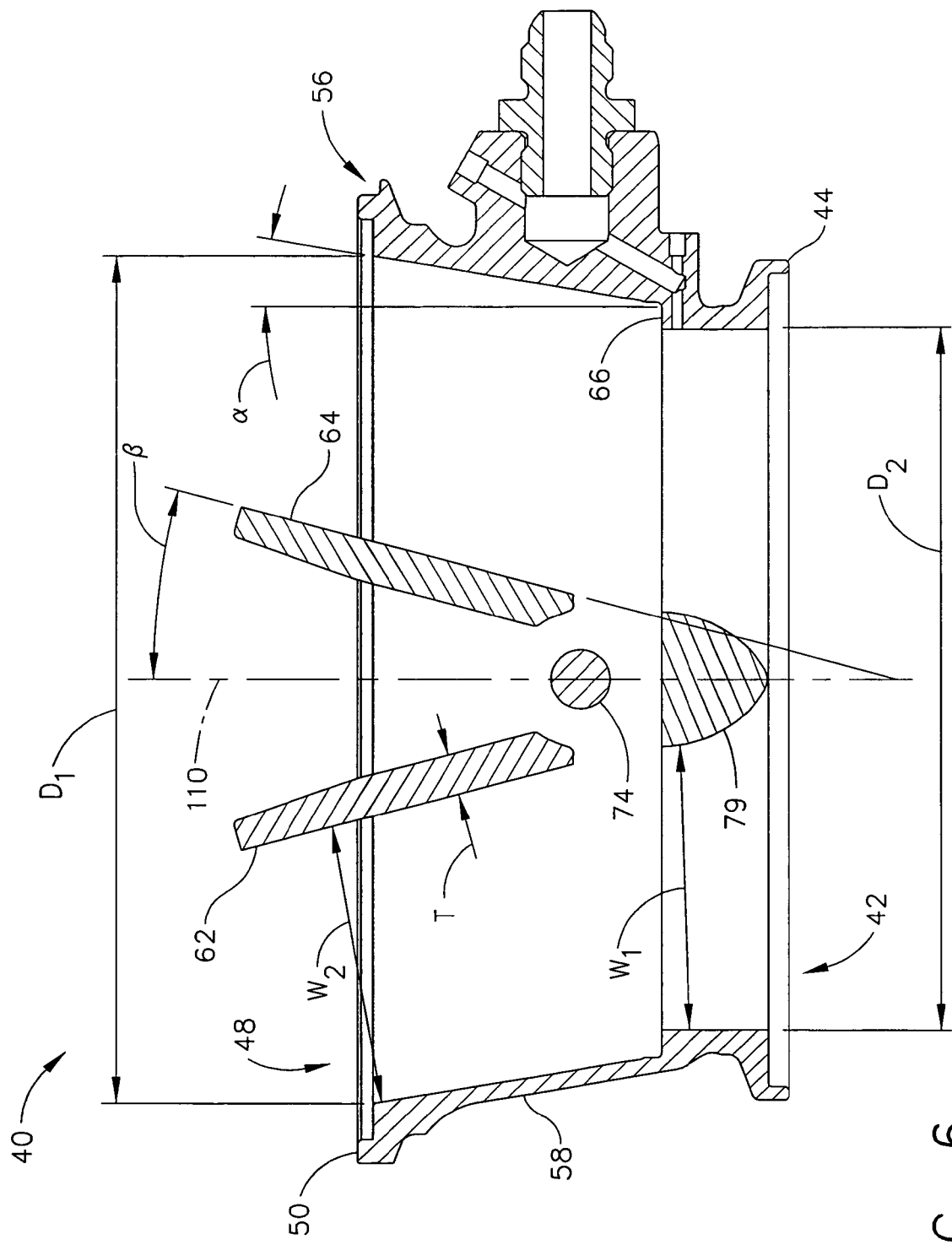
FIG. 6 is a cross sectional view of the check valve shown in FIG. 3 taken along the line 6—6.

FIG. 6 is a schematic cross-sectional view of check valve 40. Side wall 58 defines flow path 60 through valve housing 56. Flow path 60 has a centerline 110 that extends through a geometric center of valve housing 56. In FIG. 6, check valve 40 is depicted with control members 64 and 62 fully open such that flapper projections 100 are in contact with valve housing stops 70. To facilitate reducing flutter of control members 62 and 64 when fully opened, the rotation of the control members 62 and 64 is stopped at an angle β with respect to flow path centerline 110 before control members 62 and 64 are parallel to the flow path centerline 110. Angle β represents a stabilization angle wherein momentum or inertia forces from the impingement of fluid against the control members 62 and 64 act to stabilize control members 62 and 64 against flutter. In the exemplary embodiment, angle β is approximately equal to fifteen degrees.

To facilitate minimizing pressure loss through check valve 40, valve housing 56 is formed such that a cross-sectional flow path area is substantially uniform between valve inlet 42 and outlet 48 when control members 62 and 64 are fully open (as shown in FIG. 6). More specifically, the cross-sectional flow area at valve inlet 42 is proportional to an inlet flow path width represented by the arrow $W_1$. Similarly, the cross-sectional flow area at valve outlet 48 is proportional to an outlet flow path width represented by the arrow $W_2$. Valve housing side wall 58 is fabricated such that the flow path area at inlet 42 is substantially equal to the flow path area at valve outlet 48 when control members 62 and 64 are fully opened, thereby facilitating minimizing pressure loss through check valve 40. In an exemplary embodiment, valve housing side wall 58 is formed with an outward conical flare having a cone angle β relative to the flow path centerline 110. Angle β is measured between valve inlet 42 and valve outlet 48 and is selected to provide an outlet flow path width $W_2$ that is substantially equal to inlet flow path width $W_1$. In an exemplary embodiment, angle β is approximately seventy-three percent of the stabilization angle β.

Check valve 40 is assembled by pressing bushings 94 into control member mounting arms 90. Control members 62 and 64 are then positioned within valve housing 56 such that retaining pin second end 84 is inserted through aperture 72, through interleaved control member mounting arms 90, and into cavity 76. Retaining nut 88 is then installed in aperture 72 to retain retaining pin 74 therein. Retaining nut 88 is safety wired to valve housing 56 to prevent retaining nut 88, from uncoupling from housing 56. A plug or pressure sensor fitting is installed in pressure sensor port 68 as desired. The plug or pressure sensor fitting can also be safety wired in place. Thus, assembly of check valve 40 is accomplished with a minimal number of parts.

In one embodiment, check valve 40 can be used in a system to supply bleed air to an environmental control system (ECS). In operation, and with reference to FIG. 2, check valve inlet 42 is coupled to a compressor bleed port 32. Check valve outlet 48 is coupled to a bleed duct 34. The bleed port and bleed duct connections are made at valve inlet and outlet flanges 44 and 50, respectively. As fluid flow from bleed port 32 enters check valve 40, fluid pressure acting on control members 62 and 64 causes control members 62 and 64 to rotate to an open position. At sufficient pressure, control members 62 and 64 open sufficiently to engage stops 70. Side wall 58 is formed at a conical angle sized to maintain a cross sectional flow area at valve outlet 48 that is substantially equal to a cross sectional area at valve inlet 42. As a result, pressure losses through check valve 40 are facilitated to be reduced. Finally, when pressure differentials between bleed port 32 and bleed duct 34 change so as to cause a reversal in fluid flow, control members 62 and 64 rotate to a fully closed position to substantially prevent fluid flow from bleed duct 34 to bleed port 32.

The above-described check valve is cost-effective to manufacture and is highly reliable and serviceable. The check valve includes control members that have a fully open position at a angle to the fluid flow path so that the control members are stabilized against flutter. This reduces wear on the retaining pin and control members which increases the service life of the control valve, thus reducing maintenance costs. Assembly costs are also reduced due to a reduction in part count in comparison to known check valves.

Exemplary embodiments of check valve assemblies engine bleed air systems are described above in detail. The systems and assemblies are not limited to the specific embodiments described herein, but rather, components of each assembly and system may be utilized independently and separately from other components described herein. Each system and assembly component can also be used in combination with other system and assembly components.

While the invention has been described in terms of various specific embodiments, those skilled in the art will recognize that the invention can be practiced with modification within the spirit and scope of the claims.

What is claimed is:

1. A check valve comprising:
   a valve housing comprising a side wall and a flow path therethrough, said side wall defining said flow path, said flow path comprising an inlet, an outlet, and a centerline extending between said inlet and said outlet; and
   at least one control member positioned in said flow path and movable between a first position, wherein fluid flow through said valve housing is substantially prohibited and a second position wherein fluid flow is permitted, said side wall comprising a conically flared portion that is radially outward from said at least one control member, said conically flared portion includes an inlet side and an outlet side and is divergent from said inlet side to said outlet side such that a cross sectional area of said flow path outlet is substantially equal to a cross sectional area of said flow path inlet.

2. A check valve in accordance with claim 1 wherein said side wall further comprises a stop comfigured to limit movement of said at least one control member relative to said flow path centerline.

3. A check valve in accordance with claim 1 wherein said conically flared portion of said side wall is oriented obliquely with respect to said centerline at an angle that is approximately seventy-three percent of a pre-determined stop angle relative to said flow path centerline.

4. A check valve in accordance with claim 1 further comprising a retaining pin coupled within said housing, said at least one control member rotatably coupled to said retaining pin.

5. A check valve in accordance with claim 4 wherein said at least one control member comprises a first control member and a second control member, said first and second control members rotatably coupled to said retaining pin, such that said first and second control members are independently rotatable with respect to each other.

6. A check valve in accordance with claim 4 wherein said retaining pin comprises first and second opposite ends, said first end comprising a flange and a stepped portion, said stepped portion sized to be received in an aperture formed in said valve housing, and wherein said flange and said stepped portion facilitate an alignment of said at least one control member.

7. A check valve in accordance with claim 1 wherein said housing further comprises a projection extending into said flow path between an inlet to said flow path and said at least one control member, said projection is configured to divert fluid flow towards said at least one control member.

8. A check valve in accordance with claim 1 wherein said housing further comprises a static pressure sensing port.

9. A check valve in accordance with claim 1 wherein said at least one control member is tapered from a first thickness at a central portion thereof to a second thickness at an outer periphery, wherein said first thickness is greater than said second thickness.

10. A gas turbine engine bleed air supply system comprising:
   a bleed duct comprising first and second ends, said first end is coupled to at least one compressor bleed port; and
   a check valve coupled to said second end of said bleed duct, said check valve configured to permit fluid flow from said bleed duct while substantially preventing fluid flow into said bleed duct, said check valve comprising:
   a valve housing comprising a side wall and a flow path therethrough, said side wall defining said flow path, said flow path comprising an inlet, an outlet, and a centerline extending between said inlet and said outlet, a cross sectional area of said flow path outlet is substantially equal to a cross sectional area of said flow path inlet; and
   at least one control member positioned in said flow path and movable between a first position, wherein fluid flow through said valve housing is substantially prohibited and a second position wherein fluid flow is permitted, said side wall comprising a stop configured to limit movement of said at least one control member at a predetermined stop angle relative to said flow path centerline.

11. A bleed air supply system in accordance with claim 10 wherein said side wall comprises a conically flared portion that is proximate to said at least one control member, said conically flared portion is configured such that that the cross sectional area of said flow path outlet is substantially equal to the cross sectional area of said flow path inlet.

12. A bleed air supply system in accordance with claim 11 wherein said conically flared portion of said side wall is oriented obliquely with respect to said centerline at an angle that is approximately seventy-three percent of said stop angle.

13. A bleed air supply system in accordance with claim 10 wherein said housing further comprises a static pressure sensing port.

14. A bleed air supply system in accordance with claim 10 further comprising a retaining pin coupled within said housing, said at least one control member rotatably coupled to said retaining pin.

15. A bleed air supply system in accordance with claim 14 wherein said retaining pin comprises first and second opposite ends, said first end comprising a flange and a stepped portion, said stepped portion sized to be received in an aperture formed in said valve housing, and wherein said flange and said stepped portion facilitate an alignment of said at least one control member.

* * * * *